US012768657B2

(12) United States Patent
Brew et al.

(10) Patent No.: US 12,768,657 B2
(45) Date of Patent: Oct. 20, 2026

(54) DYNAMIC NAVIGATION GENERATION USING AI

(71) Applicant: INTERNATIONAL BUSINESS MACHINES CORPORATION, Armonk, NY (US)

(72) Inventors: Kevin Wayne Brew, Niskayuna, NY (US); Priti Ashvin Shah, Basking Ridge, NJ (US); Jaime D. Morillo, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 75 days.

(21) Appl. No.: 18/935,428

(22) Filed: Nov. 2, 2024

(65) Prior Publication Data

US 2026/0126295 A1 May 7, 2026

(51) Int. Cl.
*G01C 21/34* (2006.01)
*H04L 43/106* (2022.01)

(52) U.S. Cl.
CPC ..... *G01C 21/3415* (2013.01); *G01C 21/3461* (2013.01); *H04L 43/106* (2013.01)

(58) Field of Classification Search
CPC ............ G01C 21/3415; G01C 21/3461; H04L 43/106
See application file for complete search history.

(56) References Cited

U.S. PATENT DOCUMENTS 11,295,405 B2 4/2022 Dejewski et al.
12,333,622 B1 * 6/2025 Dhakshanamoorthy .................... G06Q 50/265
2014/0082369 A1 * 3/2014 Waclawsky ............ G06F 21/62 713/189
2014/0347475 A1 * 11/2014 Divakaran ............ G06V 20/52 348/135
2015/0147997 A1 * 5/2015 Shaw .................... H04W 4/029 455/456.1
2016/0109250 A1 * 4/2016 Baughman ......... G01C 21/3415 701/515
2021/0227371 A1 7/2021 Thomas (Continued)

FOREIGN PATENT DOCUMENTS

WO 2018/125588 A1 7/2018

OTHER PUBLICATIONS

"Crisis-related alerts in Google Maps", Google Maps Help, printed from the Internet on Jul. 22, 2024, 2 pages, <https://support.google.com/maps/answer/9985621?hl=en>.

(Continued)

*Primary Examiner* — Calvin Cheung
(74) *Attorney, Agent, or Firm* — Harrity & Harrity, LLP

(57) ABSTRACT

A monitoring system includes a computer hardware system with a hardware processor configured to initiate the following executable operations. Communications from one or more communication devices associated with first responders are real-time monitored. Using an artificial intelligence (AI) agent analyzing the communications, an event is detected. Using the AI agent, an event location associated with the event is identified. Using the AI agent and the event location, an occlusion zone associated with the event is generated. Map data is updated to include the occlusion zone, and the map data is used to real-time amend a route that involves the occlusion zone.

20 Claims, 3 Drawing Sheets

(56) References Cited

U.S. PATENT DOCUMENTS

2023/0196924 A1 6/2023 Khedekar

OTHER PUBLICATIONS

Beg et al. "UAV-enabled Intelligent Traffic Policing and Emergency Response Handling System for The Smart City." Personal and Ubiquitous Computing, 2021, pp. 33-50.

Chen et al., "Modeling Road Network Vulnerability for Evacuees and First Responders in No Notice Evacuation." Journal of advanced transportation, Jan. 1, 2017, 14 pages.

Coombs Timothy, "Ongoing Crisis communication", 6th Edition, retrieved from web ebooks.com, dated Feb. 10, 2025, 4 pages.

Djahel et al. "Adaptive traffic management for secure and efficient emergency services in smart cities." 2013 IEEE International Conference on Pervasive Computing and Communications Workshops (PERCOM Workshops). IEEE, Jan. 1, 2013, 5 pages.

Liu et al. "Do First Responders Trust Connected and Automated Vehicles (CAVs)? A national survey." Transport policy, 2023, pp. 85-99.

* cited by examiner

DYNAMIC NAVIGATION GENERATION USING AI

BACKGROUND

The present invention relates to artificial intelligence, and more specifically, to using artificial intelligence to derive event information from first responder communications in order to modify travel directions.

Many types of navigation systems provide route instructions to drivers of vehicles. These systems operate knowing the present location of the driver and/or vehicle along with one or more proposed destinations. Using known traffic information (e.g., congestion levels and speed along certain stretches of the roads), one or more optimal routes can be generated by the navigation system and presented to a user. As traffic information changes (e.g., a particular road becomes closed or traffic reduces the travel speed along a particular stretch of road), these navigation systems are configured to dynamically generate different routes to account for this changed traffic information. These systems, however, lack the ability to predict certain future issues that could impact the generation of an optimal route.

SUMMARY

A method is performed within and by a monitoring system. Communications from one or more communication devices associated with first responders are real-time monitored. Using an artificial intelligence (AI) agent analyzing the communications, an event is detected. Using the AI agent, an event location associated with the event is identified. Using the AI agent and the event location, an occlusion zone associated with the event is generated. Map data is updated to include the occlusion zone, and the map data is used to real-time amend a route that involves the occlusion zone.

Additionally, with the method, the route is amended by a third-party navigation provider that accesses the map data, and the occlusion zone includes a start time and/or a stop time. Also, a determination can be made that the event involves additional first responders, and rerouting information is provided to the additional first responders. Natural language processing is performed on the communications, and results of the natural language processing performed on the communications is provided to the AI agent. Additionally, a determination that additional event information is required after the event location has been identified, and a request is sent, based upon the determination and requesting the additional event information, to at least one of the one or more communication devices associated with first responders. The AI agent, based upon the event, can also make a determination that the occlusion zone is required.

A computer hardware system including a monitoring system has a hardware processor configured to initiate the following operations. Communications from one or more communication devices associated with first responders are real-time monitored. Using an artificial intelligence (AI) agent analyzing the communications, an event is detected. Using the AI agent, an event location associated with the event is identified. Using the AI agent and the event location, an occlusion zone associated with the event is generated. Map data is updated to include the occlusion zone, and the map data is used to real-time amend a route that involves the occlusion zone.

Additionally, with the computer hardware system, the route is amended by a third-party navigation provider that accesses the map data, and the occlusion zone includes a start time and/or a stop time. Also, a determination can be made that the event involves additional first responders, and rerouting information is provided to the additional first responders. Natural language processing is performed on the communications, and results of the natural language processing performed on the communications is provided to the AI agent. Additionally, a determination that additional event information is required after the event location has been identified, and a request is sent, based upon the determination and requesting the additional event information, to at least one of the one or more communication devices associated with first responders. The AI agent, based upon the event, can also make a determination that the occlusion zone is required.

A computer program product comprises a computer readable storage medium having stored therein program code. The program code, which when executed by a computer hardware system of a monitoring system, causes the computer hardware system to perform the following. Communications from one or more communication devices associated with first responders are real-time monitored. Using an artificial intelligence (AI) agent analyzing the communications, an event is detected. Using the AI agent, an event location associated with the event is identified. Using the AI agent and the event location, an occlusion zone associated with the event is generated. Map data is updated to include the occlusion zone, and the map data is used to real-time amend a route that involves the occlusion zone.

Additionally, with the computer program product, the route is amended by a third-party navigation provider that accesses the map data, and the occlusion zone includes a start time and/or a stop time. Also, a determination can be made that the event involves additional first responders, and rerouting information is provided to the additional first responders. Natural language processing is performed on the communications, and results of the natural language processing performed on the communications is provided to the AI agent. Additionally, a determination that additional event information is required after the event location has been identified, and a request is sent, based upon the determination and requesting the additional event information, to at least one of the one or more communication devices associated with first responders. The AI agent, based upon the event, can also make a determination that the occlusion zone is required.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

Figure 1:
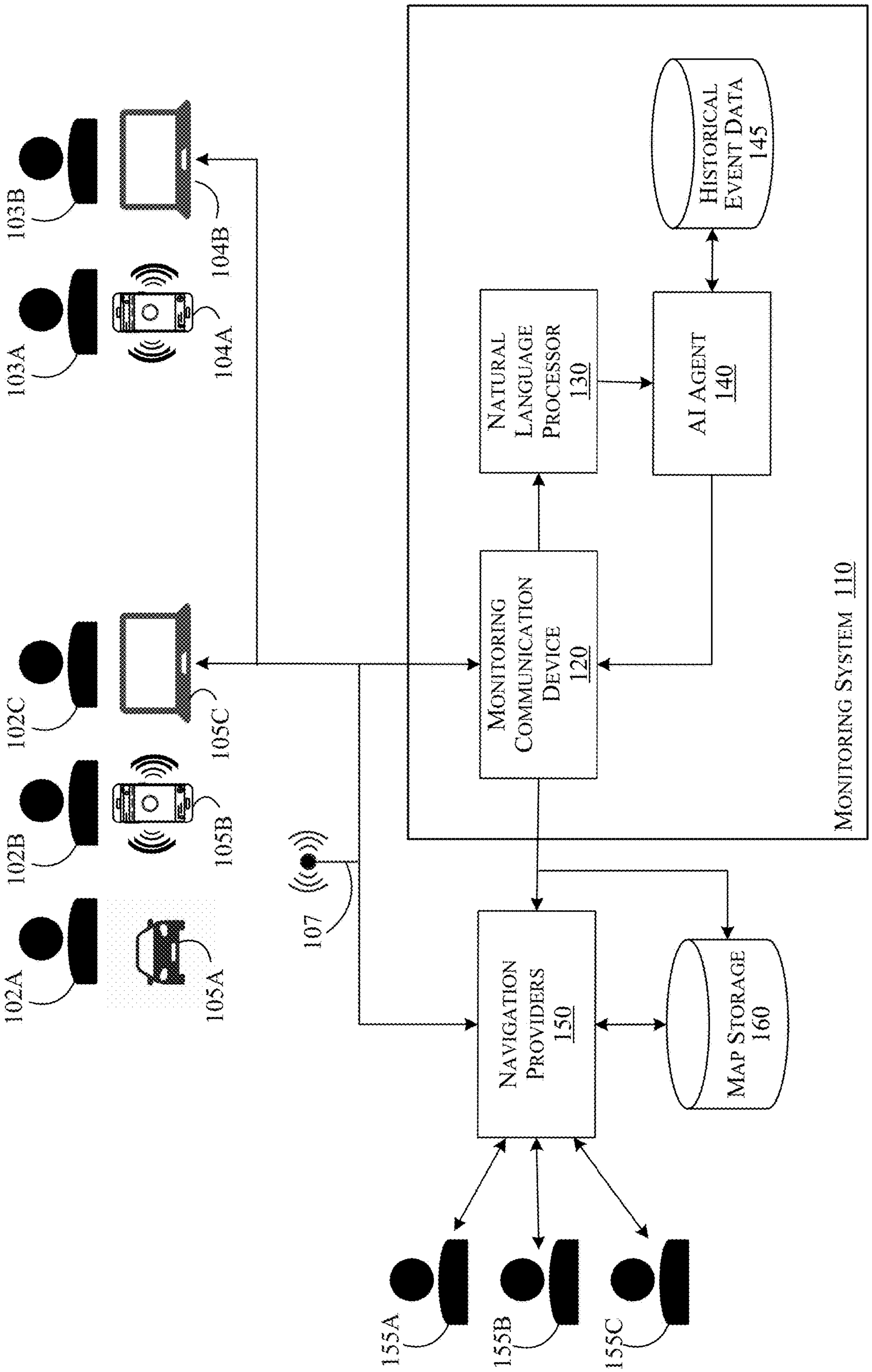
FIG. 1 is a block diagram illustrating an example architecture of an AI-enabled navigation system according to an embodiment of the present invention.
Figure 2:
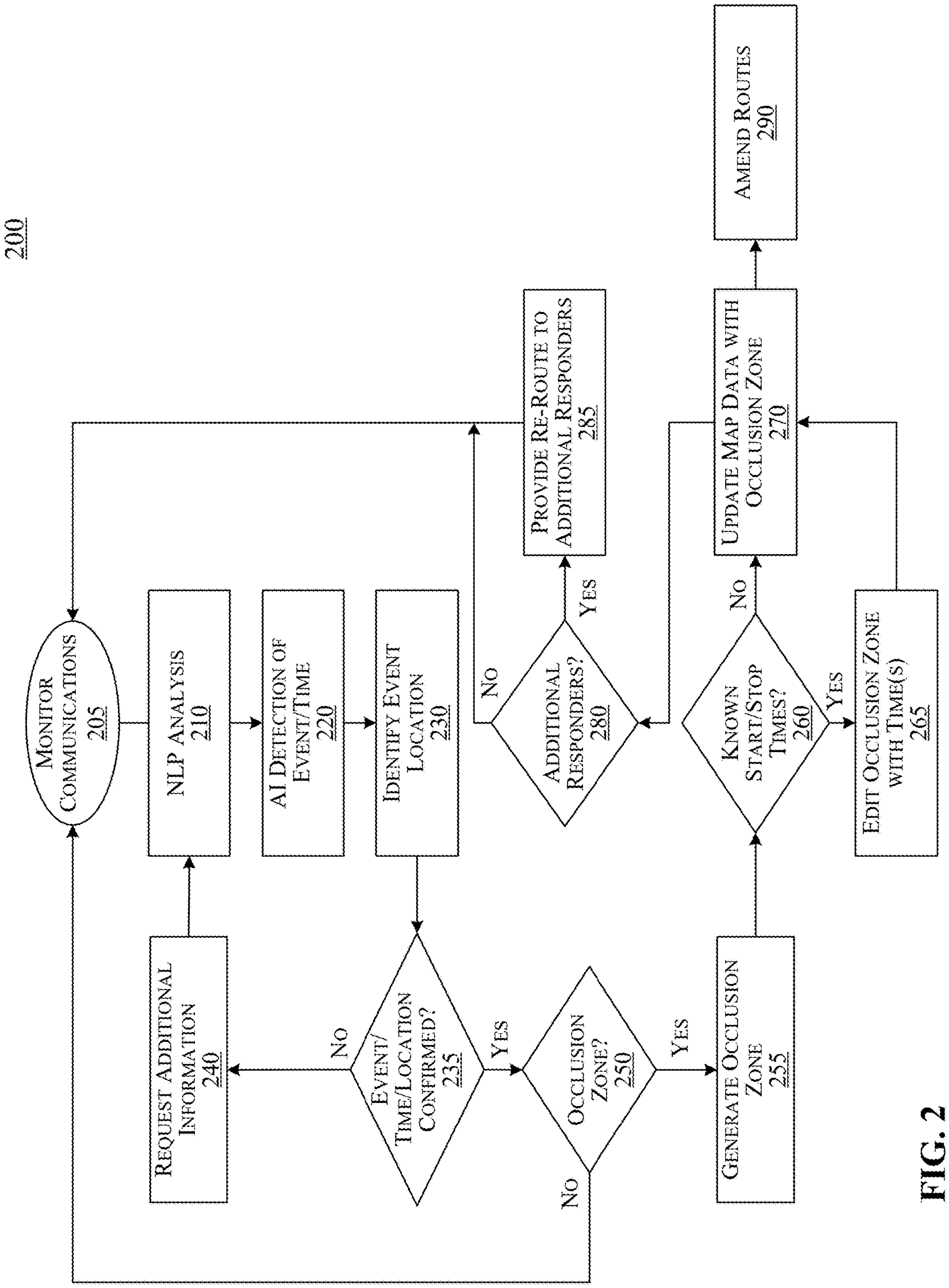
FIG. 2 is a block diagram illustrating a methodology of employing the navigation architecture of FIG. 1 according to an embodiment of the present invention.

Referring generally to FIGS. 1 and 2, an AI-enabled navigation system 100 and process 200 for generating navigation routes is disclosed. The navigation system 100 includes a monitoring system 110 that can be connected to one or more communication devices 105A-C associated with first responders 102A-C along with one or more navigation providers 150. The monitoring system 110 can be configured to include a monitoring communication device 120, natural language processor 130, artificial intelligence (AI) agent 140, and a store of historical event data 145. While shown as part of the monitoring system 110, each of these components 120, 130, 140, 145 can be provided remotely, such as part of a software as a service as further discussed in FIG. 3.

In general, electronic communications from one or more communication devices 105A-C associated with first responders 102A-C are real-time monitored using a monitoring system 110. Using the AI agent 140 analyzing the communications, an event is detected. Using the AI agent 140, an event location associated with the event is identified. Using the AI agent 140 and the event location, an occlusion zone associated with the event is generated. Map data is updated to include the occlusion zone, and the map data is used to real-time amend a route that involves the occlusion zone. The navigation generation system 100 and process 200 described herein provide specific improvements to prior systems by facilitating the dynamic generation of route guidance using predicted occlusion zones based upon types of events determined from the communication detected by the communication devices 105A-C associated with first responders. Other advantages are provided as evident from the disclosure herein.

More specifically and with reference to FIG. 2, in 205, electronic communications from communication devices 105A-C associated with first responders 102A-C are monitored. As used herein, the term "first responders" refers to official personal with specialized training for responding to events such as accidents and emergencies. Examples of first responders include law enforcement officers, emergency medical services, fire service members, search and rescue members, and public works employees. These communications can be, for example, wired communications (e.g., text and email messages from computer devices 105C) or wireless communications (e.g., radio and phone messages from wireless devices 105A, 105B). The manner in which these communications are monitored is not limited. Existing systems (e.g., wireless antennas 107 used to intercept wireless communications) are known capable of receiving and monitoring these type of communications originated from first responders and can be used as part of the monitoring communication device 120 of the monitoring system 110. Additionally, as discussed in more detail herein, the monitoring communication device 120 of the monitoring system 110 can also be configured to perform two-way communication (i.e., both send and receive communications) with the communication devices 105A-C of the first responders 102A-C.

Although operations of the monitoring system 110 are discussed with regard to first responders 102A-C, the monitoring system 110 can also monitor/process public electronic communications from communication devices 104A-B associated with the public 103A-B. For example, electronic communications from first responders 102A-C and electronic communications from public 103A-B may be found in different channels, which can be separately monitored by the monitoring system 110. An example of a channel with electronic communications from the public is social media.

In 210, natural language processing (NLP) is performed, as necessary, on the electronic communications received from the communication devices 105A-C of the first responders 102A-C using the natural language processor 130. Natural language processing is a known technology, and the natural language processor 130 is not limited as to a particular type of technology. The output of the natural language processor 130 is then fed to the AI agent 140.

In 220, the AI agent 140 is configured to extract certain data from the output of the natural language processor 130 and/or directly from the communications of the communication devices 105A-C of the first responders 102A-C. In particular, the AI agent 140 is configured to extract event data from the communications received from the communication devices 105A-C of the first responders 102A-C. As used herein, the term "event data" includes data that identifies a particular event associated with a particular geographic location. In particular, the event data includes data that identifies: (i) a type of event (e.g., fire, car crash, police activity, traffic) and (ii) start and/or stop time of the event. Additionally, in 230, the AI agent 140 is configured to identify a particular geographic location of the event from the communications of the communication devices 105A-C of the first responders 102A-C. The location of the event can be a specific address such as street location or building. Alternatively, the location of the event could encompass a large region, such as a neighborhood or a particular route. This geographic location information is included as part of the event data.

When determining the geographic location of a particular event, the AI agent 140 can leverage historical event data 145 that associates particular events with a particular location. For example, an identification of the term "downtown stadium" can refer to a particular area surrounding a downtown location associated with a stadium. Alternatively, the term "intersection of Main Street and Oak Street" can refer to a specific point location. These locations or areas can then be translated by the AI agent 140 into GPS coordinates. Additionally, the AI agent 140 can leverage historical event data 145 to identify particular types of events. For example, certain first responders use known codes to refer to specific types of events.

In 230, the AI agent 140 is configured to determine whether additional information about the event is required and/or requires confirmation. For example, the AI agent 140 may determine that a particular event is happening but the communications can be interpreted as two (or more) possible locations. Alternatively, the event may be of the type in which a particular start time and/or stop time may be possible (e.g., planned road closures or a concert ending). If a determination is made that additional event information is needed and/or is required to be confirmed, then the AI agent 140 requests that the monitoring communication device 120 send an electronic communication to one of the communication devices 105A-C of the first responders 102A-C requesting additional information/confirmation. In this manner, a dialogue can be created between the monitoring system 110 and the communication devices 105A-C of the first responders 102A-C to obtain additional event data and/or clarify the already-received event data.

If sufficient event data has been collected and no additional event data is required, the process proceeds to 250 in which a determination is made, by the AI agent 140, whether an occlusion zone associated with the event should be created. The AI agent 140 can employ historical event data 145 to determine whether an occlusion zone should be created. If the determination is that an occlusion zone is not to be created, the process 200 can return to 205 to continue to monitor communications.

If a determination is made to create an occlusion zone, in 255, the AI agent 140 creates the occlusion zone. As used herein, an "occlusion zone" refers to a single boundary or multiple boundaries, associated with a particular event and/or location, around which traffic (e.g., pedestrian, vehicular, or the like) is to be diverted and is defined as a particular data structure associated with the event. The AI agent 140 can also employ historical event data 145 to generate the occlusion zone. For example, a determination may be made, based upon the type of event, that a particular radius around the event location should be part of the occlusion zone. In other instances, such as in a traffic accident, only a particular portion of the street involved in the traffic accident is determined to be part of the occlusion zone. In another example, such as a concert ending, a large area around the concert venue along with known parking areas surrounding the concert venue can be included as part of the occlusion zone. In yet another example, an identification of a fire at a building may require all streets surrounding the building to be within the occlusion zone and the presence of known flammable areas in the area may cause a size of the occlusion zone to be further expanded.

In 260, a determination is made whether there are known start and/or stop times associated with the event. If start and/or stop times are associated with the event, this information can also be appended, in 265, to the data structure that defines the occlusion zone. For example, if the event is determined to be transitory (e.g., traffic will only be impacted for 10 minutes due to passage of emergency vehicles), a stop time can be associated with the occlusion zone. Also, if the event is determined to not yet happen but is expected to start at a particular time (e.g., a concert letting out), a start time can be associated with the occlusion zone. By appending start and/or stop times to the occlusion zone, subsequent directions being generated based upon the occlusion zone can only be impacted during actual occurrence of the event and not prior to and/or after the event occurring when redirection away from the occlusion zone might be considered unnecessary.

In 270, the AI agent 140, in conjunction with the monitoring communication device 120, causes map data to be updated with the occlusion zone. As previously indicated, the map data can be stored within map storage 160, and the map storage 160 is not limited as to a particular location. For example, the map storage 160 could be separate from both the monitoring system 110 and any navigation providers 150 that would employ the map data. Alternatively, the map storage 160 could be contained within individual ones of the navigation providers 150 and/or the monitoring system 110.

In 290, the navigation providers 150 can access the occlusion zone within the map data stored within the map storage. Based upon the occlusion zone, travel directions can be modified by the navigation providers 150 to avoid the occlusion zone. The navigation providers 150 can also use the start and/or stop times (if available) associated with the occlusion zone in generating travel directions. These travel directions can then be provided to map users 155A-C via communication devices (e.g., not shown but comparable to communication devices 105A-C).

In 280, an optional determination can be made if additional first responders are either in route to the event and/or will be impacted in their travel by the event. If a determination is made that additional first responders are either in route to the event and/or will be impacted in their travel by the event, the process proceeds to 285, in which the AI agent 140 can provide (either via the monitoring communication device 120 or the navigation providers 150) re-routing information based upon the occlusion zone created for the event. Otherwise, the process 200 returns to 205 in which additional communications are monitored.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

Figure 3:
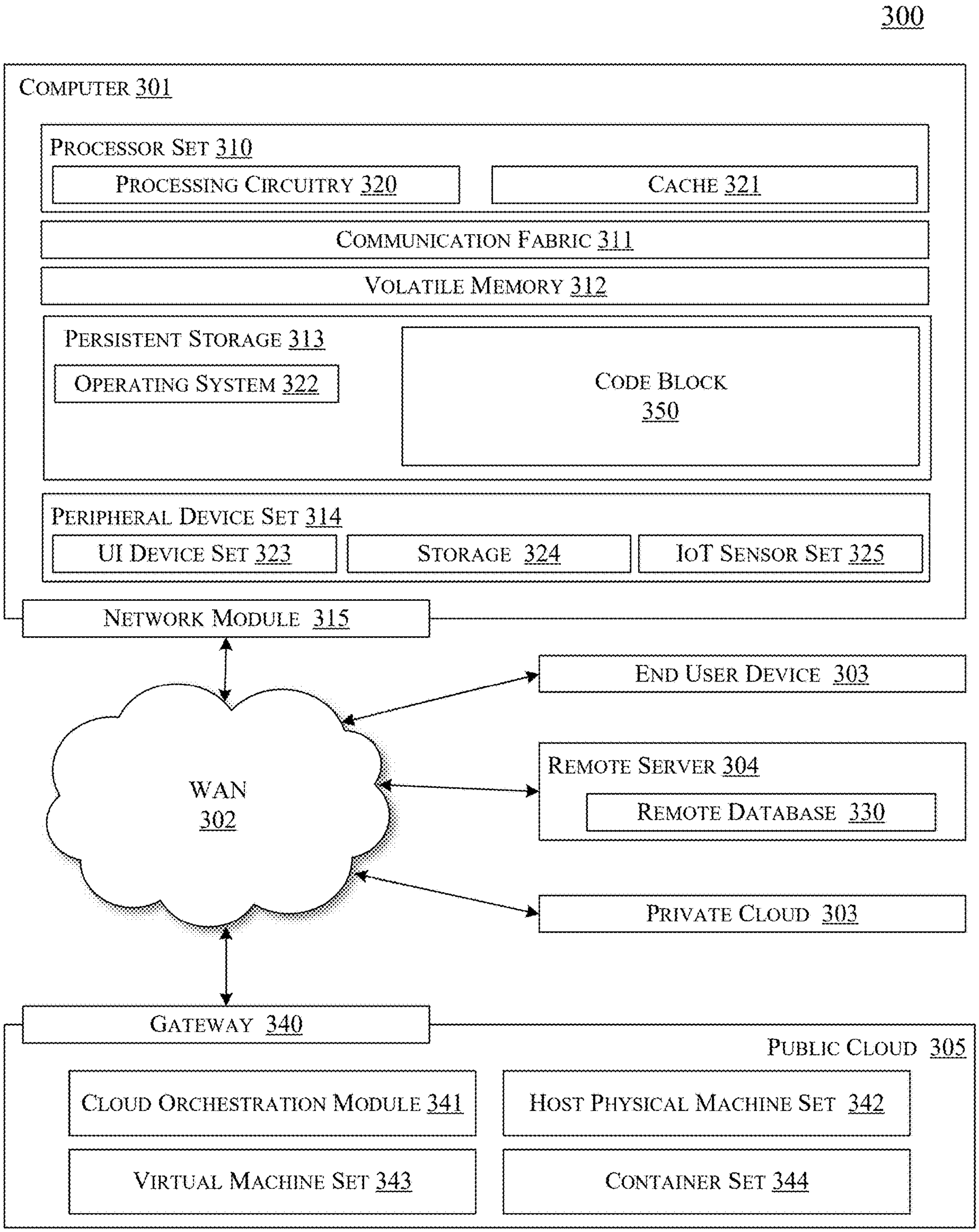
FIG. 3 is a block diagram illustrating an example of a computer environment for implementing portions of the methodology of FIG. 2.

Referring to FIG. 3, computing environment 300 contains an example of an environment for the execution of at least some of the computer code involved in performing the inventive methods, such as code block 350 for implementing the operations of the monitoring system 110. Computing environment 300 includes, for example, computer 301, wide area network (WAN) 302, end user device (EUD) 303, remote server 304, public cloud 305, and private cloud 306. In certain aspects, computer 301 includes processor set 310 (including processing circuitry 320 and cache 321), communication fabric 311, volatile memory 312, persistent storage 313 (including operating system 322 and method code block 350), peripheral device set 314 (including user interface (UI), device set 323, storage 324, and Internet of Things (IoT) sensor set 325), and network module 315. Remote server 304 includes remote database 330. Public cloud 305 includes gateway 340, cloud orchestration module 341, host physical machine set 342, virtual machine set 343, and container set 344.

Computer 301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 330. As is well understood in the art of computer technology, and depending upon the technology, performance of a computer-implemented method may be distributed among multiple computers and/or between multiple locations. However, to simplify this presentation of computing environment 300, detailed discussion is focused on a single computer, specifically computer 301. Computer 301 may or may not be located in a cloud, even though it is not shown in a cloud in FIG. 3 except to any extent as may be affirmatively indicated.

Processor set 310 includes one, or more, computer processors of any type now known or to be developed in the future. As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. Processing circuitry 320 may be distributed over multiple packages, for example, multiple, coordinated integrated circuit chips. Processing circuitry 320 may implement multiple processor threads and/or multiple processor cores. Cache 321 is memory that is located in the processor chip package(s) and is typically used for data or code that should be available for rapid access by the threads or cores running on processor set 310. Cache memories are typically organized into multiple levels depending upon relative proximity to the processing circuitry. Alternatively, some, or all, of the cache for the processor set may be located "off chip." In certain computing environments, processor set 310 may be designed for working with qubits and performing quantum computing.

Computer readable program instructions are typically loaded onto computer 301 to cause a series of operational steps to be performed by processor set 310 of computer 301 and thereby effect a computer-implemented method, such that the instructions thus executed will instantiate the methods specified in flowcharts and/or narrative descriptions of computer-implemented methods discussed above in this document (collectively referred to as "the inventive methods"). These computer readable program instructions are stored in various types of computer readable storage media, such as cache 321 and the other storage media discussed below. The program instructions, and associated data, are accessed by processor set 310 to control and direct performance of the inventive methods. In computing environment 300, at least some of the instructions for performing the inventive methods may be stored in code block 350 in persistent storage 313.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible, hardware device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Communication fabric 311 is the signal conduction paths that allow the various components of computer 301 to communicate with each other. Typically, this communication fabric 311 is made of switches and electrically conductive paths, such as the switches and electrically conductive paths that make up busses, bridges, physical input/output ports and the like. Other types of signal communication paths may be used for the communication fabric 311, such as fiber optic communication paths and/or wireless communication paths.

Volatile memory 312 is any type of volatile memory now known or to be developed in the future. Examples include dynamic type random access memory (RAM) or static type RAM. Typically, the volatile memory 312 is characterized by random access, but this is not required unless affirmatively indicated. In computer 301, the volatile memory 312 is located in a single package and is internal to computer 301. In addition to alternatively, the volatile memory 312 may be distributed over multiple packages and/or located externally with respect to computer 301.

Persistent storage 313 is any form of non-volatile storage for computers that is now known or to be developed in the future. The non-volatility of the persistent storage 313 means that the stored data is maintained regardless of whether power is being supplied to computer 301 and/or directly to persistent storage 313. Persistent storage 313 may be a read only memory (ROM), but typically at least a portion of the persistent storage 313 allows writing of data, deletion of data and re-writing of data. Some familiar forms of persistent storage 313 include magnetic disks and solid state storage devices. Operating system 322 may take several forms, such as various known proprietary operating systems or open source Portable Operating System Interface type operating systems that employ a kernel. The code included in code block 350 typically includes at least some of the computer code involved in performing the inventive methods.

Peripheral device set 314 includes the set of peripheral devices for computer 301. Data communication connections between the peripheral devices and the other components of computer 301 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet.

In various aspects, UI device set 323 may include components such as a display screen, speaker, microphone, wearable devices (such as goggles and smart watches), keyboard, mouse, printer, touchpad, game controllers, and haptic devices. Storage 324 is external storage, such as an external hard drive, or insertable storage, such as an SD card. Storage 324 may be persistent and/or volatile. In some aspects, storage 324 may take the form of a quantum computing storage device for storing data in the form of qubits. In aspects where computer 301 is required to have a large amount of storage (for example, where computer 301 locally stores and manages a large database) then this storage 324 may be provided by peripheral storage devices designed for storing very large amounts of data, such as a storage area network (SAN) that is shared by multiple, geographically distributed computers. Internet-of-Things (IoT) sensor set 325 is made up of sensors that can be used in IoT applications. For example, one sensor may be a thermometer and another sensor may be a motion detector.

Network module 315 is the collection of computer software, hardware, and firmware that allows computer 301 to communicate with other computers through a Wide Area Network (WAN) 302. Network module 315 may include hardware, such as modems or Wi-Fi signal transceivers, software for packetizing and/or de-packetizing data for communication network transmission, and/or web browser software for communicating data over the internet. In certain aspects, network control functions and network forwarding functions of network module 315 are performed on the same physical hardware device. In other aspects (for example, aspects that utilize software-defined networking (SDN)), the control functions and the forwarding functions of network module 315 are performed on physically separate devices, such that the control functions manage several different network hardware devices. Computer readable program instructions for performing the inventive methods can typically be downloaded to computer 301 from an external computer or external storage device through a network adapter card or network interface included in network module 315.

WAN 302 is any Wide Area Network (for example, the internet) capable of communicating computer data over non-local distances by any technology for communicating computer data, now known or to be developed in the future. In some aspects, the WAN 302 ay be replaced and/or supplemented by local area networks (LANs) designed to communicate data between devices located in a local area, such as a Wi-Fi network. The WAN 302 and/or LANs typically include computer hardware such as copper transmission cables, optical transmission fibers, wireless transmission, routers, firewalls, switches, gateway computers and edge servers.

End user device (EUD) 303 is any computer system that is used and controlled by an end user (for example, a customer of an enterprise that operates computer 301), and may take any of the forms discussed above in connection with computer 301. EUD 303 typically receives helpful and useful data from the operations of computer 301. For example, in a hypothetical case where computer 301 is designed to provide a recommendation to an end user, this recommendation would typically be communicated from network module 315 of computer 301 through WAN 302 to EUD 303. In this way, EUD 303 can display, or otherwise present, the recommendation to an end user. In certain aspects, EUD 303 may be a client device, such as thin client, heavy client, mainframe computer, desktop computer and so on.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein. As defined herein, the term "user" means a person (i.e., a human being).

Remote server 304 is any computer system that serves at least some data and/or functionality to computer 301. Remote server 304 may be controlled and used by the same entity that operates computer 301. Remote server 304 represents the machine(s) that collect and store helpful and useful data for use by other computers, such as computer 301. For example, in a hypothetical case where computer 301 is designed and programmed to provide a recommendation based on historical data, then this historical data may be provided to computer 301 from remote database 330 of remote server 304. As defined herein, the term "server" means a data processing system configured to share services with one or more other data processing systems.

Public cloud 305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 305 is performed by the computer hardware and/or software of cloud orchestration module 341. The computing resources provided by public cloud 305 are typically implemented by virtual computing environments that run on various computers making up the computers of host physical machine set 342, which is the universe of physical computers in and/or available to public cloud 305. The virtual computing environments (VCEs) typically take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through WAN 302.

VCEs can be stored as "images," and a new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 306 is similar to public cloud 305, except that the computing resources are only available for use by a single enterprise. While private cloud 306 is depicted as being in communication with WAN 302, in other aspects, a private cloud 306 may be disconnected from the internet entirely (e.g., WAN 302) and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this aspect, public cloud 305 and private cloud 306 are both part of a larger hybrid cloud.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

As another example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. Each block in the flowchart or block diagrams may represent a module, segment, or portion of instructions, which comprises one or more executable instructions for implementing the specified logical function(s).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "if," "when," "upon," "in response to," and the like are not to be construed as indicating a particular operation is optional. Rather, use of these terms indicate that a particular operation is conditional. For example and by way of a hypothetical, the language of "performing operation A upon B" does not indicate that operation A is optional. Rather, this language indicates that operation A is conditioned upon B occurring.

The foregoing description is just an example of embodiments of the invention, and variations and substitutions. While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

What is claimed is:

1. A method, within and by a monitoring system including a computer hardware system, comprising:
- real-time monitoring private communications from one or more communication devices associated with first responders;
- real-time monitoring public communications via a separate communication channel from a private communication channel that is used for the real-time monitoring the private communications;
- detecting, using an artificial intelligence (AI) agent analyzing one or more of the private communications or the public communications, an event;
- identifying, using the AI agent, an event location associated with the event;
- generating, using the AI agent and the event location, an occlusion zone associated with the event;
- updating map data to include the occlusion zone, wherein the map data is used to real-time amend a route that involves the occlusion zone; and
- providing, using the AI agent and to one or more additional first responders that are in route to the event, re-routing information that is based on the occlusion zone.

2. The method of claim 1, wherein the occlusion zone includes a start time and/or a stop time.

3. The method of claim 1, wherein
- a determination is made that the one or more additional first responders are in route to the event and will be impacted in their travel by the event, and
- the providing the re-routing information is based on the determination.

4. The method of claim 1, wherein
- natural language processing is performed, and
- results of the natural language processing are provided to the AI agent.

5. The method of claim 1, wherein
- a determination is made that additional event information is required after the event location has been identified, and a request is sent, based upon the determination and requesting the additional event information, to at least one of the one or more communication devices associated with the first responders.

6. The method of claim 1, wherein the route is amended by a third-party navigation provider that accesses the map data.

7. The method of claim 1, wherein the AI agent, based upon the event, makes a determination that the occlusion zone is required.

8. The method of claim 1, further comprising:
identifying a type of the event based on historical data, wherein the type of the event is associated with a code utilized by the first responders.

9. A monitoring system including a computer hardware system, comprising:
a hardware processor configured to initiate the following executable operations:
real-time monitoring private communications from one or more communication devices associated with first responders;
real-time monitoring public communications via a separate communication channel from a private communication channel that is used for the real-time monitoring the private communications;
detecting, using an artificial intelligence (AI) agent analyzing one or more of the private communications or the public communications, an event;
identifying, using the AI agent, an event location associated with the event;
generating, using the AI agent and the event location, an occlusion zone associated with the event;
updating map data to include the occlusion zone, wherein the map data is used to real-time amend a route that involves the occlusion zone; and
providing, using the AI agent and to one or more additional first responders that are in route to the event, re-routing information that is based on the occlusion zone.

10. The monitoring system of claim 9, wherein the occlusion zone includes a start time and/or a stop time.

11. The monitoring system of claim 9, wherein
a determination is made that the one or more additional first responders are in route to the event and will be impacted in their travel by the event, and
the providing the re-routing information is based on the determination.

12. The monitoring system of claim 9, wherein
natural language processing is performed, and
results of the natural language processing performed are provided to the AI agent.

13. The monitoring system of claim 9, wherein
a determination is made that additional event information is required after the event location has been identified, and
a request is sent, based upon the determination and requesting the additional event information, to at least one of the one or more communication devices associated with the first responders.

14. The monitoring system of claim 9, wherein the route is amended by a third-party navigation provider that accesses the map data.

15. The monitoring system of claim 9, wherein the AI agent, based upon the event, makes a determination that the occlusion zone is required.

16. A computer program product, comprising:
a non-transitory computer readable storage medium having stored therein program code,
the program code, which when executed by a computer hardware system within a monitoring system, causes the computer hardware system to perform:
real-time monitoring private communications from one or more communication devices associated with first responders;
real-time monitoring public communications via a separate communication channel from a private communication channel that is used for the real-time monitoring the private communications;
detecting, using an artificial intelligence (AI) agent analyzing one or more of the private communications or the public communications, an event;
identifying, using the AI agent, an event location associated with the event;
generating, using the AI agent and the event location, an occlusion zone associated with the event;
updating map data to include the occlusion zone, wherein
the map data is used to real-time amend a route that involves the occlusion zone; and
providing, using the AI agent and to one or more additional first responders that are in route to the event, re-routing information that is based on the occlusion zone.

17. The computer program product of claim 16, wherein the occlusion zone includes a start time and/or a stop time.

18. The computer program product of claim 16, wherein
a determination is made that the one or more additional first responders are in route to the event and will be impacted in their travel by the event, and
the providing the re-routing information is based on the determination.

19. The computer program product of claim 16, wherein
natural language processing is performed, and
results of the natural language processing are provided to the AI agent.

20. The computer program product of claim 16, wherein
a determination is made that additional event information is required after the event location has been identified, and
a request is sent, based upon the determination and requesting the additional event information, to at least one of the one or more communication devices associated with the first responders.

* * * * *